United States Patent
Johnstone, III et al.

(10) Patent No.: US 7,107,725 B2
(45) Date of Patent: *Sep. 19, 2006

(54) SWIVEL JOINT APPARATUS AND METHOD FOR UTILITY SUPPLY TO A ROTATABLE BUILDING

(75) Inventors: Albert E. Johnstone, III, 4903 Mt. Helix Dr., La Mesa, CA (US) 91941; Frank W. Ratliff, Alpine, CA (US)

(73) Assignees: Albert E. Johnstone, III, La Mesa, CA (US); Janet L. Johnstone, La Mesa, CA (US), as Tenants in Common ( * ) Notice: Subject to any disclaimer, the term of this patent is extended or adjusted under 35 U.S.C. 154(b) by 579 days.

This patent is subject to a terminal disclaimer.

(21) Appl. No.: 09/942,294

(22) Filed: Aug. 29, 2001

(65) Prior Publication Data

US 2002/0045383 A1 Apr. 18, 2002

Related U.S. Application Data

(63) Continuation-in-part of application No. 09/687,687, filed on Oct. 13, 2000, now Pat. No. 6,742,308.

(51) Int. Cl.
   *E04B 1/346* (2006.01)
(52) U.S. Cl. ............... 52/65; 52/220.2; 52/220.8; 137/357
(58) Field of Classification Search ............... 52/65, 52/73, 83, 29.34, 220.8, 220.1; 137/580, 137/560, 615, 616, 628.11; 285/41, 98, 108, 285/136, 351
See application file for complete search history.

(56) References Cited

U.S. PATENT DOCUMENTS

| 360,508 | A | * | 4/1887 | Brown ............... 52/65 |
| 390,093 | A | * | 9/1888 | Pauly et al. ........... 52/65 |
| 407,877 | A | * | 7/1889 | Rowe ............... 52/29 |
| 2,563,531 | A | * | 8/1951 | Kirkman ........... 52/65 |
| 3,517,694 | A | | 6/1970 | Lieffring |
| 3,599,378 | A | * | 8/1971 | Kachnic ........... 52/29 |
| 3,636,975 | A | * | 1/1972 | Kirkman et al. ......... 137/580 |
| 3,664,523 | A | * | 5/1972 | Hagel ............... 414/255 |

(Continued)

FOREIGN PATENT DOCUMENTS

DE 3426708 A1 1/1986

(Continued)

*Primary Examiner*—Robert Canfield
(74) *Attorney, Agent, or Firm*—Gordon & Rees LLP

(57) ABSTRACT

A swivel joint apparatus for supplying utilities to a rotating building rotatable about a central axis has a first, fixed member for securing to a fixed base of the building to extend co-axially with a central axis of rotation of the building, and a second member rotatably mounted on the first member for securing to the rotatable part of the building. The first member has a series of spaced annular chambers and at least one ring seal mounted on the peripheral edge of each flange for rotatable sealing engagement with the outer casing so that the casing forms an outer wall of each of the annular chambers. A lower end wall of the spindle has a plurality of ports for connection to fixed utility lines in the base for fluid supply to and from the building, each port connected through the spindle to a respective annular chamber. The outer casing has a series of axially spaced ports for connection to respective utility lines in the rotatable part of the building, the ports including at least one port communicating with each of the annular chambers.

15 Claims, 7 Drawing Sheets

U.S. PATENT DOCUMENTS

| | | | |
|---|---|---|---|
| 3,827,199 A | | 8/1974 | Tax |
| 3,851,663 A | * | 12/1974 | Neuko ..................... 137/580 |
| 3,905,166 A | * | 9/1975 | Kaiser ......................... 52/65 |
| 3,910,309 A | * | 10/1975 | Kaiser ..................... 137/580 |
| 3,933,400 A | | 1/1976 | Helgeson |
| 4,016,990 A | * | 4/1977 | Hodkin et al. ............. 414/398 |
| 4,065,891 A | | 1/1978 | Burgin |
| 4,234,215 A | * | 11/1980 | Wilson ....................... 285/41 |
| 4,250,918 A | * | 2/1981 | Tuson et al. ............... 137/580 |
| 4,262,694 A | * | 4/1981 | McConnell ................ 239/728 |
| 4,318,198 A | * | 3/1982 | Drozd ....................... 14/71.5 |
| 4,353,608 A | * | 10/1982 | Massau ......................... 439/3 |
| 4,498,398 A | * | 2/1985 | Vallee ....................... 104/44 |
| 4,558,890 A | * | 12/1985 | Schartz ....................... 285/13 |
| 4,602,806 A | * | 7/1986 | Saliger ....................... 285/41 |
| 4,644,707 A | * | 2/1987 | Aubourg et al. .............. 52/65 |
| 4,726,316 A | * | 2/1988 | Bruns ........................ 114/263 |
| 4,750,428 A | | 6/1988 | Hyte |
| 4,759,573 A | * | 7/1988 | Delamare ................ 285/124.4 |
| 4,817,345 A | | 4/1989 | McGlew |
| 4,877,054 A | * | 10/1989 | Walter ....................... 137/560 |
| 4,953,488 A | * | 9/1990 | Heidtmann ................... 114/44 |
| 5,113,974 A | * | 5/1992 | Vayda ......................... 186/36 |
| 5,205,768 A | * | 4/1993 | Pollack ......................... 441/5 |
| 5,702,130 A | * | 12/1997 | Jostein ....................... 285/96 |
| 5,755,160 A | * | 5/1998 | Blufordcraving ............ 104/36 |
| 5,829,941 A | * | 11/1998 | Zamorano Morfin ....... 414/261 |
| 5,918,424 A | * | 7/1999 | Rice ............................. 52/65 |
| 5,922,941 A | * | 7/1999 | Winkler et al. ................ 73/40 |
| 6,073,970 A | * | 6/2000 | Ott et al. ...................... 285/13 |
| 6,336,751 B1 | * | 1/2002 | Shibayama ................. 396/411 |
| 6,336,781 B1 | * | 1/2002 | Doppelmayr et al. ....... 414/253 |
| 6,401,746 B1 | * | 6/2002 | Scott, Jr. .................... 137/312 |
| 6,402,202 B1 | * | 6/2002 | Colombo ................. 285/121.1 |
| 6,457,280 B1 | * | 10/2002 | Park ............................. 52/65 |
| 6,742,308 B1 | * | 6/2004 | Johnstone et al. ............. 52/65 |
| 2004/0103594 A1 | * | 6/2004 | Johnstone et al. ............. 52/65 |

FOREIGN PATENT DOCUMENTS

| | | |
|---|---|---|
| DE | 90 16 212.9 | 3/1991 |
| FR | 1420219 | 12/1965 |
| FR | 2 429 956 | 1/1980 |

\* cited by examiner

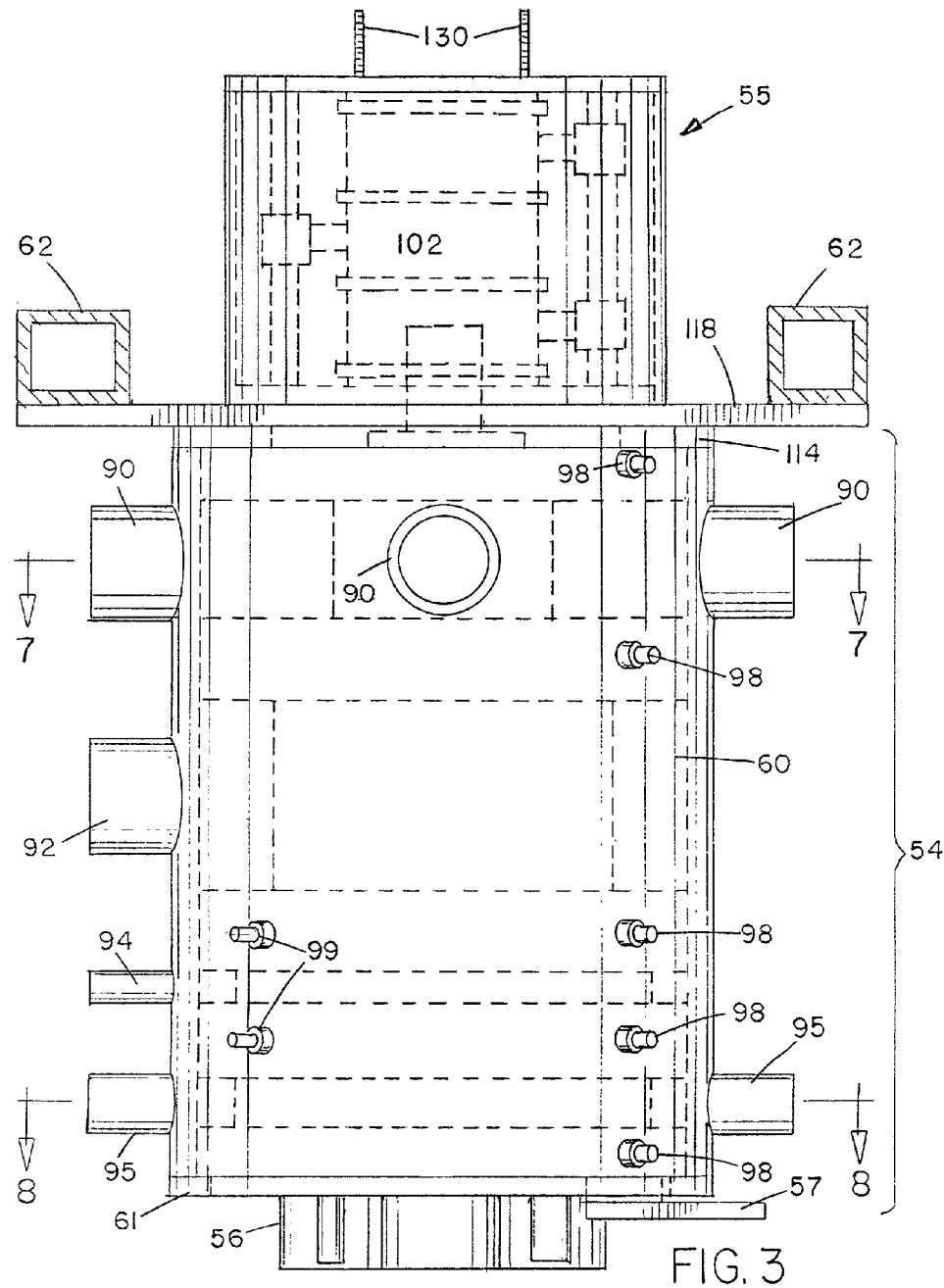
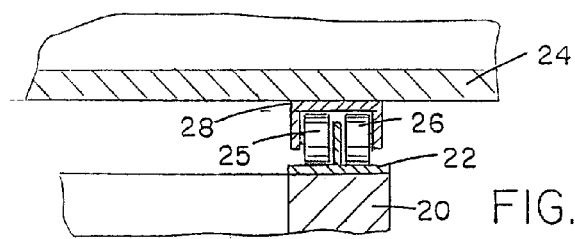
FIG. 3
FIG. 1A

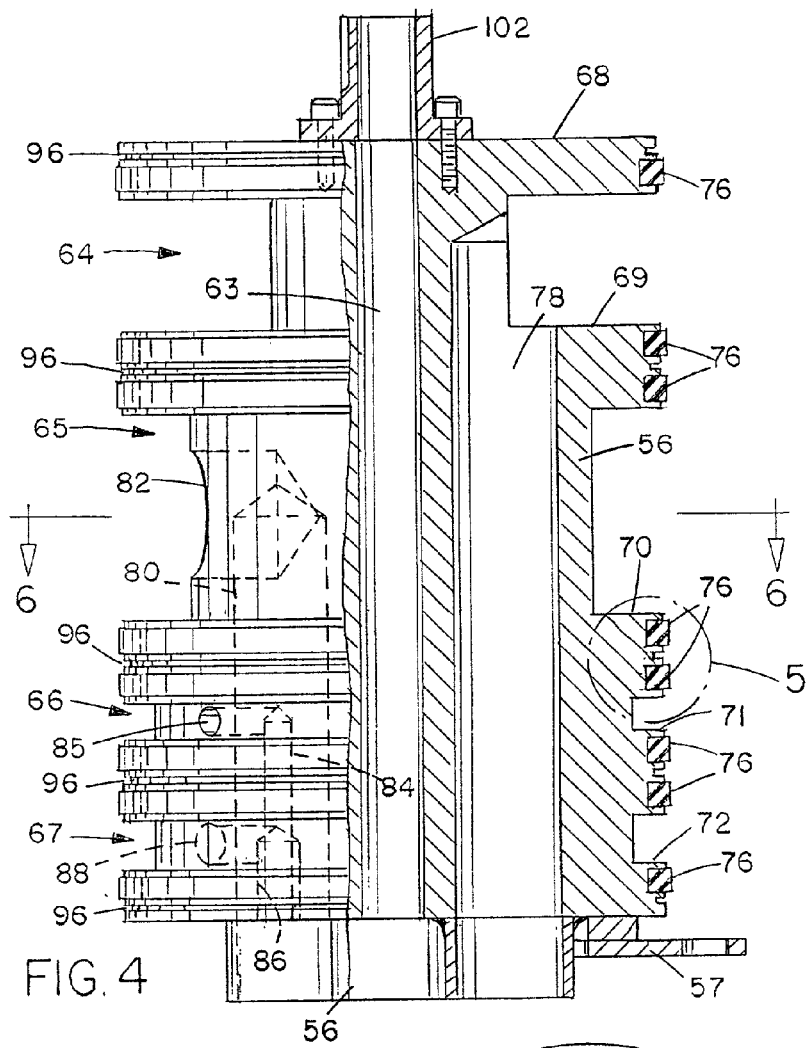
FIG. 4
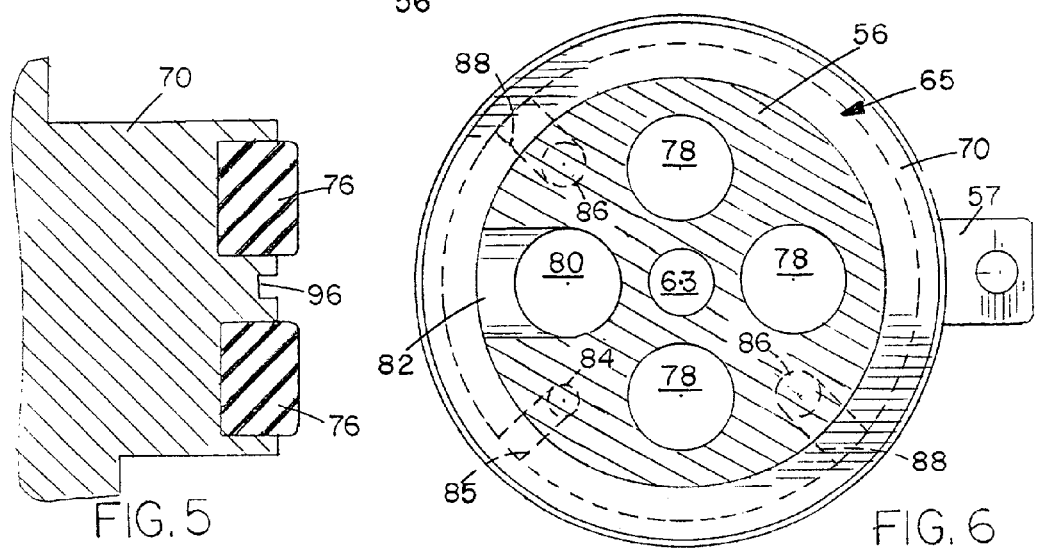
FIG. 5
FIG. 6

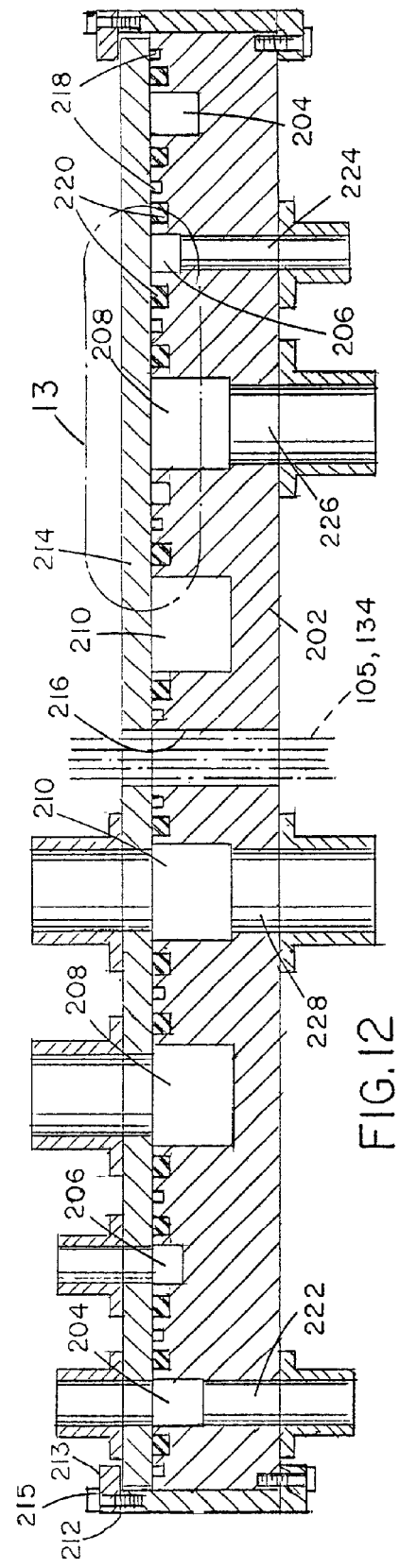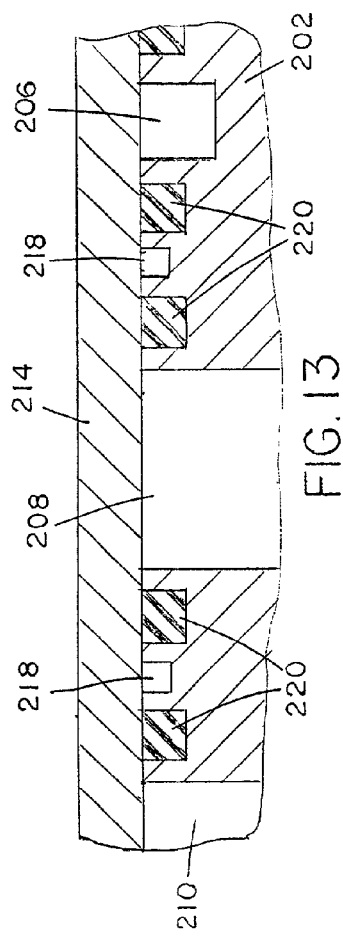

SWIVEL JOINT APPARATUS AND METHOD FOR UTILITY SUPPLY TO A ROTATABLE BUILDING

CROSS REFERENCE TO RELATED APPLICATIONS

This application is a Continuation-In-Part of application Ser. No. 09/687,687, filed Oct. 13, 2000 now U.S. Pat. No. 6,742,308.

BACKGROUND OF THE INVENTION

The present invention relates generally to rotatable buildings, and is particularly concerned with a service or utilities supply swivel joint apparatus and method for such a building.

Although rotating buildings such as restaurants have been constructed in the past, up to now there has been no effective and safe way to provide services utilities or services such as water, gas or electrical power from stationary lines into the rotating part of the structure. Typically, such services are provided in a fixed central portion of the building about which an outer portion rotates.

Some prior art references have proposed swivel structures for providing services within the rotating part of a building, but these are relatively complex and cumbersome, and would have problems in passing building safety codes. For example, U.S. Pat. No. 3,599,378 of Kachnic and U.S. Pat. No. 3,636,975 of Kirkman both describe utility arrangements for rotating buildings. In Kachnic, a rotatable hollow support column is rotatably mounted on a fixed pedestal and extends upwardly through the building so as to rotate with the building. Various rotary T and L joints are provided for connecting fixed portions of the gas and water pipes with portions which rotate with the building. This produces a relatively complex structure. In Kirkman, a chamber member is fixed to a stationary base, and a cover member for the chamber member rotates with the building. The chamber and cover are provided with various opposing annular formations of generally U-shaped form or opposing partial chambers to which the fixed conduits and rotating conduits, respectively, are connected. This provides for waste material discharge, gas supply, and water supply. Again, this is relatively complex and would probably not pass building codes. It also does not provide for electrical connections into the building.

U.S. Pat. No. 4,353,608 of Massau describes a system of collectors for passage of fluids and electrical cables into and out of a rotatable dwelling. Each collector is generally annular in shape, comprising an inner fixed ring and an outer rotating ring rotatably connected together to define an annular chamber between them.

Another problem with existing swivel structures for rotatable buildings is that the seals between rotating portions of the swivel are subject to potential failure. There is no means of effectively detecting such failure other than by taste or appearance of the water supply, for example.

SUMMARY OF THE INVENTION

It is an object of the present invention to provide a new and improved swivel joint apparatus and method for supplying utilities to a rotatable building.

According to one aspect of the present invention, a swivel joint apparatus is provided for supplying utilities to a rotating building rotatable about a central axis. The swivel joint apparatus comprises a first, fixed part for securing to a fixed base of the rotatable building to extend co-axially with the central axis of rotation of the building, and a second part rotatably mounted on the first part for securing to a portion of the rotating building, so that it rotates on the first part as the building rotates relative to the fixed part. The first and second parts together define a plurality of chambers, each chamber having fixed wall portions in the first part and rotating wall portions on the second part, and a plurality of seals between the fixed and rotating wall portions to prevent leakage from the chamber. The first part has a plurality of ports connected to the respective chambers for connection to fixed utility lines in the base of the building, and the rotatable part also has a plurality of ports connected to the respective chambers for connection of utility fluids to and from the rotating part of the building.

In one embodiment of the invention, the first part has an upper wall and a lower wall, with a series of co-axial, radially spaced annular, upwardly facing chambers in the upper wall. At least one port extends outwardly from each chamber through the lower wall. The second part comprises a disc rotatably mounted over the upper wall of the first part to cover the chambers and form an upper rotating wall portion of each annular chamber. The disc has a plurality of ports positioned such that at least one port is aligned with each of the chambers as the disc rotates. Annular seal members are provided on opposite sides of each of the annular chambers to prevent fluid leakage out of the chambers.

In another embodiment of the invention, the first part of the apparatus comprises an inner, fixed spindle having a series of axially spaced, outwardly projecting annular flanges defining a series of annular chambers between each adjacent pair of flanges, each flange having an outer peripheral edge and at least one ring seal mounted on the peripheral edge of each flange, the flanges having a predetermined outer diameter, and the second part comprises an outer casing rotatably mounted on the spindle for securing to part of the rotating building, the casing having an inner diameter substantially equal to the outer diameter of the flanges, the casing forming an outer wall of each of the annular chambers and being in rotatable sealing engagement with each of the ring seals to seal the chambers. The spindle has a lower end wall with a plurality of ports for connection to fixed utility lines in the fixed base of the building for fluid supply to and from the building, and a bore extending from each port through the spindle to a respective annular chamber, with each chamber being connected to at least one port in the lower end wall. The outer casing has a series of axially spaced ports including at least one port communicating with each of the annular chambers.

An outwardly directed, annular sensor chamber may be positioned between the ring seals, and a plurality of fluid sensors are mounted in the chambers to sense any leakage of fluid past any of the seals. The sensor outputs are connected to a control unit which indicates failure of any of the seals. The simple construction of the rotary utilities swivel assembly is such that it can be easily accessed for repair, simply by disconnecting the attached utility lines via suitable quick disconnect fixtures, and removing and replacing any malfunctioning seal. At least two sensors may be provided in each of the sensor chambers, so that seal failure will still be detected even if one of the sensors should fail.

At least four annular chambers may be provided on the first part of the swivel apparatus, and the chambers are of different sizes depending on the fluid to be passed through the chamber. The chambers may include a sewer chamber for transmitting waste from fixtures in the building to fixed sewer lines in the base, a gray water chamber for transmitting waste water from sinks, baths, showers and the like to gray water disposal lines in the base, a water chamber for supplying mains water to taps in various fixtures within the rotatable building, and a gas supply chamber for supply of gas to any gas fixtures in the building. Two ring seals may be provided between each two adjacent chambers, with a sensor chamber between each pair of ring seals to detect leakage of fluid past any of the ring seals, the sensors in each sensor chamber between the gas supply chamber and adjacent chambers including both water sensors and gas sensors.

In an exemplary embodiment, an electrical swivel assembly is mounted on the upper walls oft he spindle and outer casing, the electrical swivel assembly comprising a fixed contact core mounted on the upper wall of the fixed spindle and an outer rotating contact portion mounted on the upper wall of the outer casing, the spindle and contact core having aligned central through bores for passageway of fixed electrical power supply lines from the base of the building to the contact core, and the outer contact portion having contacts for connection to power supply lines supplying power to fixtures within the rotating building. A separate rotary electrical connector may be mounted on the electrical swivel for supply of electrical signals such as telephone, television, cable, computer, e-mail and Internet to and from the rotating building, the rotary connector having a fixed part for connection to fixed electrical service lines extending through the aligned central through bores of the spindle and electrical contact core, and a rotary part rotatably mounted on the fixed part and having conductors for connection to electrical service lines within the rotating building, the fixed part being coupled to the inner contact core of the electrical swivel.

According to another aspect of the present invention, a method of rotatably connecting fixed utility lines beneath a rotatable building to corresponding utility lines secured within the building and rotatable with the building is provided, which comprises the steps of:

connecting a plurality of fixed utility lines in a fixed base of a rotatable building to inlet ports at the lower end of a fixed member secured to the fixed base and extending co-axially with the axis of rotation of the building, the first member having a plurality of spaced annular chambers, each port being connected to a respective chamber;

connecting a second member rotatably mounted on the first member to part of the rotating building so that the second member rotates with the building, the second member forming a rotating wall portion of each of the annular chambers; and connecting a plurality of utility lines secured within the rotatable building to respective ports in the second member, at least one port in the second member communicating with each of the annular chambers.

The swivel joint apparatus of this invention is very simple and compact in construction, yet allows for reliable connection of fixed utility lines in a fixed base of a rotatable building to corresponding utility lines mounted within the rotating part of the building. The seal and sensor arrangement allows any leakage of fluids past a seal to be detected, avoiding or reducing the risk of different fluids mixing together without knowledge of the occupants of the rotatable building. This swivel joint apparatus therefore enables a rotatable building to meet stringent building codes more readily.

BRIEF DESCRIPTION OF THE DRAWINGS

The present invention will be better understood from the following detailed description of an exemplary embodiment of the invention, taken in conjunction with the accompanying drawings in which like reference numerals refer to like parts and in which:

FIG. 1A is a sectional view of the circled area labeled 1A in FIG. 1, illustrating the outer rail support of the rotating part of the structure on the lower fixed base;

FIG. 3 is front elevational view of the swivel support apparatus;

FIG. 4 is a front elevational view, partially in section, of the inner fixed core of the swivel assembly;

FIG. 5 is an enlarged section of the circled portion of FIG. 4 labeled 5;

FIG. 6 is a section on the lines 6—6 of FIG. 4;

FIG. 12 is an enlarged sectional view taken on line 12—12 of FIG. 11; and

FIG. 13 is an enlargement of the area encircled in FIG. 12.

DETAILED DESCRIPTION OF THE DRAWINGS

Figure 1:
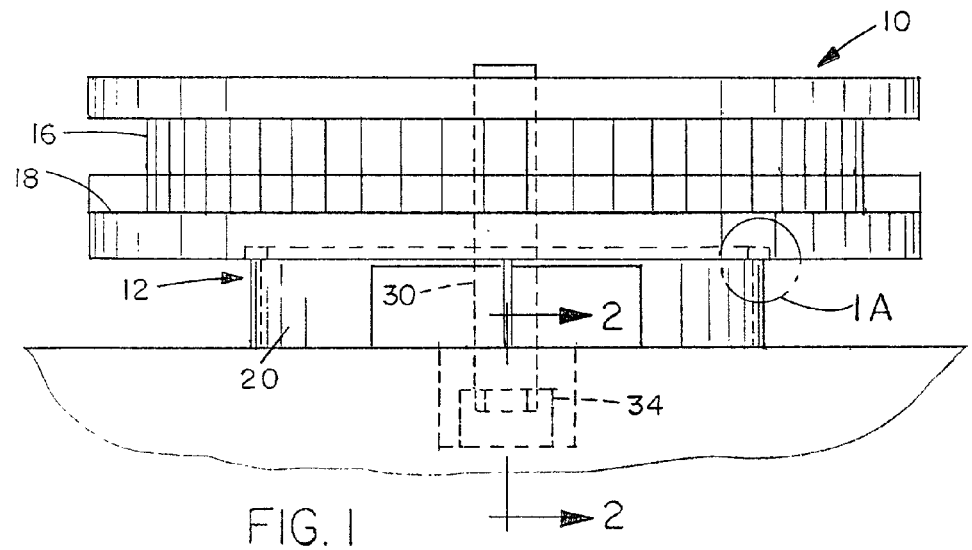
FIG. 1 is a front elevational view of a rotatable building having a service supply swivel support apparatus according to a first embodiment of the present invention.
Figure 2:
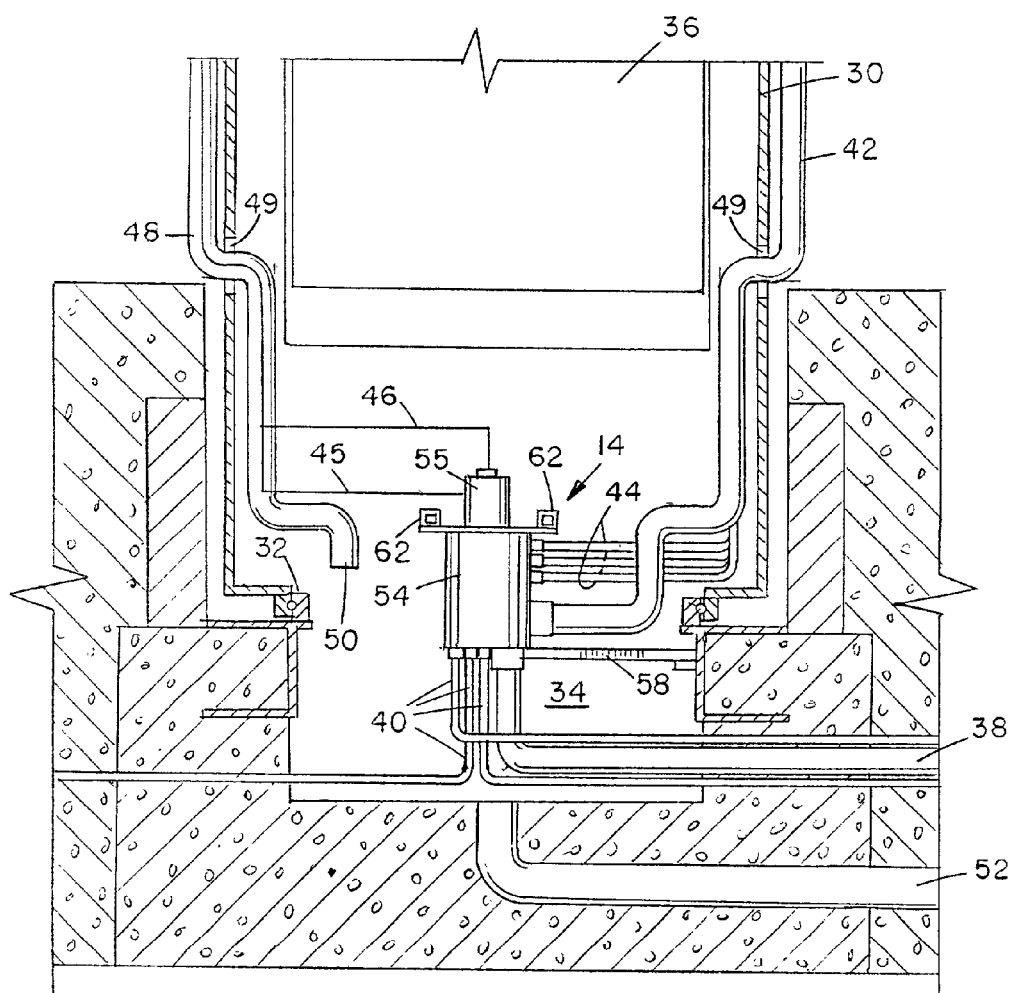
FIG. 2 is a cross-section through a portion of the support base of the building on lines 2—2 of FIG. 1, with some of the utility lines into and out of the building omitted for clarity.

FIG. 1 of the drawings illustrates a rotatable building such as a house or the like which has a rotatable portion or living area 10 rotatably supported on a fixed base 12 as illustrated in FIGS. 1A and 2. A service swivel joint assembly 14 according to a preferred embodiment of the present invention is provided in the fixed base for supplying electrical power and services, water, gas, and other utilities to the rotating structure.

The rotatable building 10 in the illustrated embodiment is circular in shape, although other shapes may be utilized, and has an enclosed central living area 16, which preferably has windows around the entire circumference, surrounded by an annular deck or balcony 18 extending around the entire outer periphery of the building. The fixed base 12 has a cylindrical outer wall 20 with an inverted T rail 22 of steel running around its upper rim, as illustrated in FIG. 1A. The floor 24 of the rotating structure has a series of spaced inner and outer bearings 25,26 which run around the rail and which are mounted in wobble boxes 28 in groups of four. The base 12 provides a garage space for storage of vehicles and the like.

The rotating portion 10 of the building is also rotatably supported at its center via a central elevator shaft 30 which is rotatably supported at its lower end on a bearing assembly 32 in a central swivel chamber or pit 34 which is located below the ground level and centered on the central axis of the building, as indicated in FIGS. 1 and 2. Elevator shaft 30 extends upwardly from the submerged chamber 34 to the top of the building, and an elevator car 36 within the shaft is suitably driven to transport the inhabitants from the garage level to and from the upper stories of the building. The central bearing assembly 32 is of sufficient strength to support the rotating elevator shaft 30. In one example, the shaft 30 had an outer diameter of six feet and a height of 28 feet, and the bearing was a six feet diameter, 1,364,000 lb bearing model A18-60P1B manufactured by Rotek, Inc. of Aurora, Ohio.

Various fixed utility lines such as sewer line 38, and other utility lines 40 such as water, waste water or gray water, gas, electrical power, and electrical services such as telephone, cable, television, computer, and the like, are directed into the chamber 34 for connection to a fixed part of the swivel joint assembly 14. Corresponding sewer 42, other utilities 44, electrical power lines 45, and electrical service lines 46 are connected to rotating parts of the swivel joint assembly at their lower ends, and extend upwardly alongside the elevator shaft 30 for connection to plumbing, gas and electrical fixtures throughout the rotating portion of the building. A drain line 48 extends downwardly from the roof of the building alongside the elevator shaft and back through a window 49 in the shaft within the chamber 34. Line 48 has an outlet end 50 directed downwardly in the pit or chamber 34. A drain outlet 52 is provided in the lower end of the chamber 34 for drainage of water from the roof. It will be understood that the various incoming and outgoing service lines are shown schematically and not in any particular order. Also, in practice, all of the lines can be directed outwardly through a single rectangular opening in the elevator shaft to one side of the shaft, although they are illustrated extending on opposite sides in FIG. 2 for convenience and clarity. The arrangement of the incoming and outgoing lines will be dependent on the position of the building relative to the various adjacent service lines.

The swivel joint assembly 14 according to a first embodiment of the invention will now be described in more detail with reference to FIGS. 2 to 9. The assembly 14 has a lower portion 54 for coupling the gas, sewer and water lines into and out of the rotating structure, and an upper portion 55 for coupling the electrical power and service lines. The assembly includes a first member comprising an inner fixed spool 56 and a second member comprising an outer swivel casing 60 rotatably mounted on fixed spool 56 as illustrated in FIGS. 3 and 6 to 8. The first and second members comprise the lower or plumbing portion of the swivel assembly. The upper portion comprises an electrical swivel assembly 55 and is mounted above the first and second members. The fixed spool 56 is coupled to the fixed base of the building via a torque bracket or lug 57 connected to torque tie 58 within pit 34, as indicated in FIG. 2. The swivel casing 60 is connected to the rotating portion 10 of the building by support beams 62 which extend across the top of the casing as illustrated in FIGS. 2 and 3, and are secured at their opposite ends to the rotating shaft 30. The casing 60 is rotatably supported on a fixed brass bearing ring 61 at its lower end, which in turn is secured to torque bracket or lug 57, as indicated in FIG. 3.

The fixed inner spool 56 is illustrated in detail in FIGS. 4 to 8 and has a central through bore 63 and a plurality of outwardly facing, annular chambers 64,65,66, and 67 separated by annular flanges 68,69,70,71 and 72 at the top and bottom of the spool and between each adjacent pair of chambers. The chambers 64, 65, 66, and 67 are open at their outer ends to define outwardly facing annular openings, as illustrated in FIG. 4. The swivel casing is a cylindrical member which rotates around the inner spool and has a diameter slightly greater than the diameter of the outer rings 68 to 72, so that it forms an outer wall for each of the annular chambers, as best illustrated for chamber 65 in FIG. 6 and chamber 64 in FIG. 7. Ring seals 76 are mounted on each annular ring to project outwardly into rotatable sealing engagement with the inner surface of casing, 60, sealing each of the chambers from the adjacent chambers and the exterior of the swivel joint assembly. One ring seal 76 is mounted on each of the upper and lower rings 68 and 72, while two spaced ring seals 76 are provided on each of the rings 69, 70 and 71 which separate adjacent chambers, for additional security. The seals are of any suitable resilient seal material of sufficient durability and reliability. Suitable seals for use as the ring seals 76 are Z-seals with a nitride or poly-vi lip and a fluorotrel base, as manufactured by Northern American Seals of Fresno, Calif.

Figure 7:
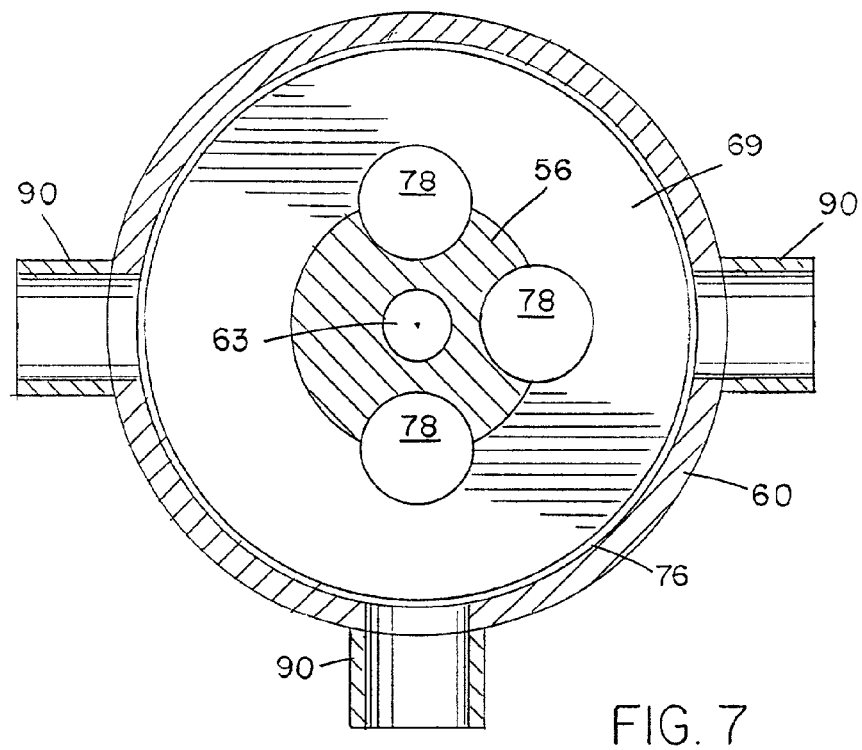
FIG. 7 is a section on the lines 7—7 of FIG. 3.
Figure 8:
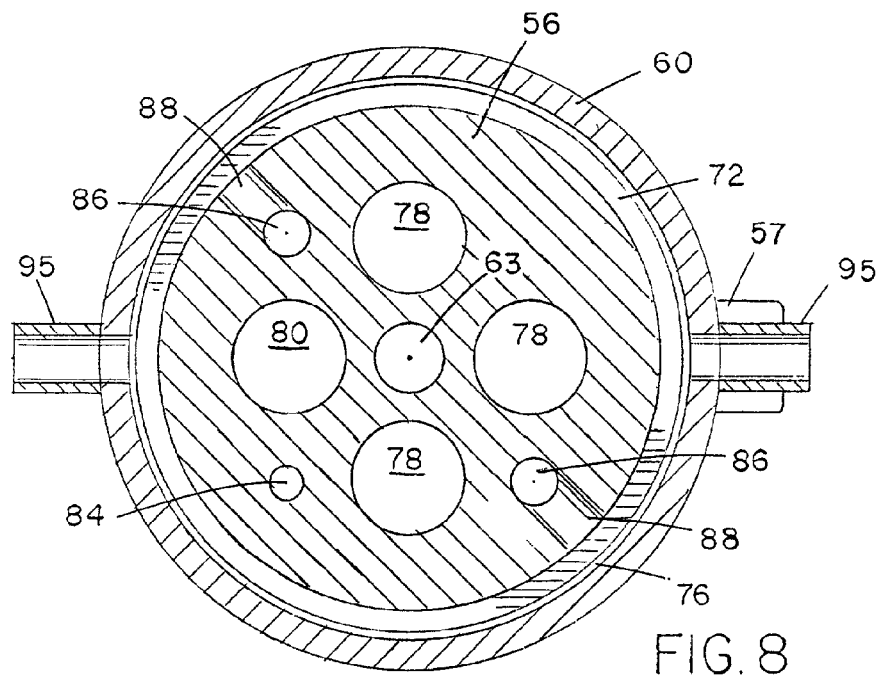
FIG. 8 is a section on the lines 8—8 of FIG. 3.

The annular chambers 64 to 67 are of different sizes, depending on the required fluid capacity. Each chamber is connected to one or more of a first set of ports 78,80,84,86 extending upwardly from the lower end of the spool through the central portion of the spool and terminating in the respective chamber. The upper, relatively large annular chamber 64 is designated as a sewer chamber, the next chamber 65 is for gray or waste water, the third chamber 66 is for gas, and the fourth chamber 67 is for the clean water supply to the house. As indicated in FIGS. 4, 6 and 7, a series of three ports or bores 78 are connected to the fixed sewer line 38 at the lower end of the spool, and extend upwardly through the spool to terminate in chamber 64. A port or bore 80 of equivalent diameter to ports 78 is connected to a fixed, gray water outlet line 40 and extends upwardly through spool 56 to terminate at an outlet 82 in chamber 65, as indicated in FIGS. 4 and 6. A third bore or port 84 of smaller diameter is connected to a gas line 40 at the lower end of the assembly 14 and extends upwardly through the spool to terminate at an inlet 85 into chamber 66. A pair of ports or bores 86 extends from fixed water lines 40 through the spool to terminate at an inlet 88 into the lowermost or clean water chamber 67, as illustrated in FIGS. 3, 4 and 8.

The outer swivel casing forms an outer, rotating cylindrical wall extending over the outwardly facing openings of each of the chambers 64 to 67, and includes a second set of ports 90,92,94,95 for connection to utility lines extending to various fixtures within the rotating part of the building, such as sinks, showers, baths, toilets, gas powered devices and the like. As best illustrated in FIGS. 3 and 7, three ports 90 project radially through the wall of casing 60 and communicate with the sewer chamber 64. A gray water port 92 is spaced beneath one of the ports 90 and communicates with the gray water chamber 65. A small diameter gas port 94 is positioned in the casing beneath port 92 and communicates with gas distribution chamber 66. Finally, a pair of clean water ports 95 is positioned below port 94 and communicates with water chamber 67, as illustrated in FIG. 8. The various sewer and utility lines 42, 44, only some of which are shown in FIG. 2 for illustration purposes, are connected to the various ports 90, 92, 94 and 95 and extend upwardly alongside the elevator shaft 30, exiting away from the shaft at the two or more floor levels for connection to the appropriate fixtures within the living areas of the rotating structure.

Each of the annular rings or flanges 68 to 72 defining the axial end walls of the various chambers also has a groove or indent 96 on its outer periphery which forms an annular sensor chamber. The indent 96 is located between the seal rings on the annular flanges 69, 70 and 71 between adjacent chambers, and above or below the seal ring 76 on the end flanges 68 and 72, respectively. As illustrated in FIG. 3, a pair of diametrically opposed fluid sensors 98 is mounted on the outer swivel casing 60 to extend through sealed holes in the casing into the uppermost indent or chamber 96. A pair of diametrically opposed fluid sensors 98 are also mounted to extend through the casing into the chamber 96 in flange 69. Fluid sensors 98 comprise water sensors and will detect any leakage of sewer water from the sewer chamber 64. Fluid or water sensors 98 also project through the casing into the chambers 96 in flanges 70, 71 and 72, as indicated in FIG. 3, to detect any leakage of gray water from chamber 65, or clean water from chamber 67. Fluid sensors 99 also extend into the chambers 96 in flanges 70 and 71 at opposite ends of the gas supply chamber 66. Fluid sensors 99 comprise gas sensors, so that these chambers have sensors for detecting leakage of either gas or water past the seals 76, as illustrated in FIG. 3.

The utility swivel assembly therefore incorporates multiple sensors for detecting failure of any of the ring seals. Each sensor chamber has at least two sensors for water, and the sensor chambers between gas and water chambers have two water sensors and two gas sensors. This provides redundancy in case of failure of a sensor. There are two annular or ring seals between adjacent chambers, providing further redundancy to reduce the risk of any mixing between the various fluid inputs and outputs to and from the house. The sensor outputs will be connected to a control unit having a computer controller within the house, and will indicate failure of any of the seals. The swivel assembly is very simple in construction and provides easy access for repair or replacement of seals or sensors.

Figure 9:
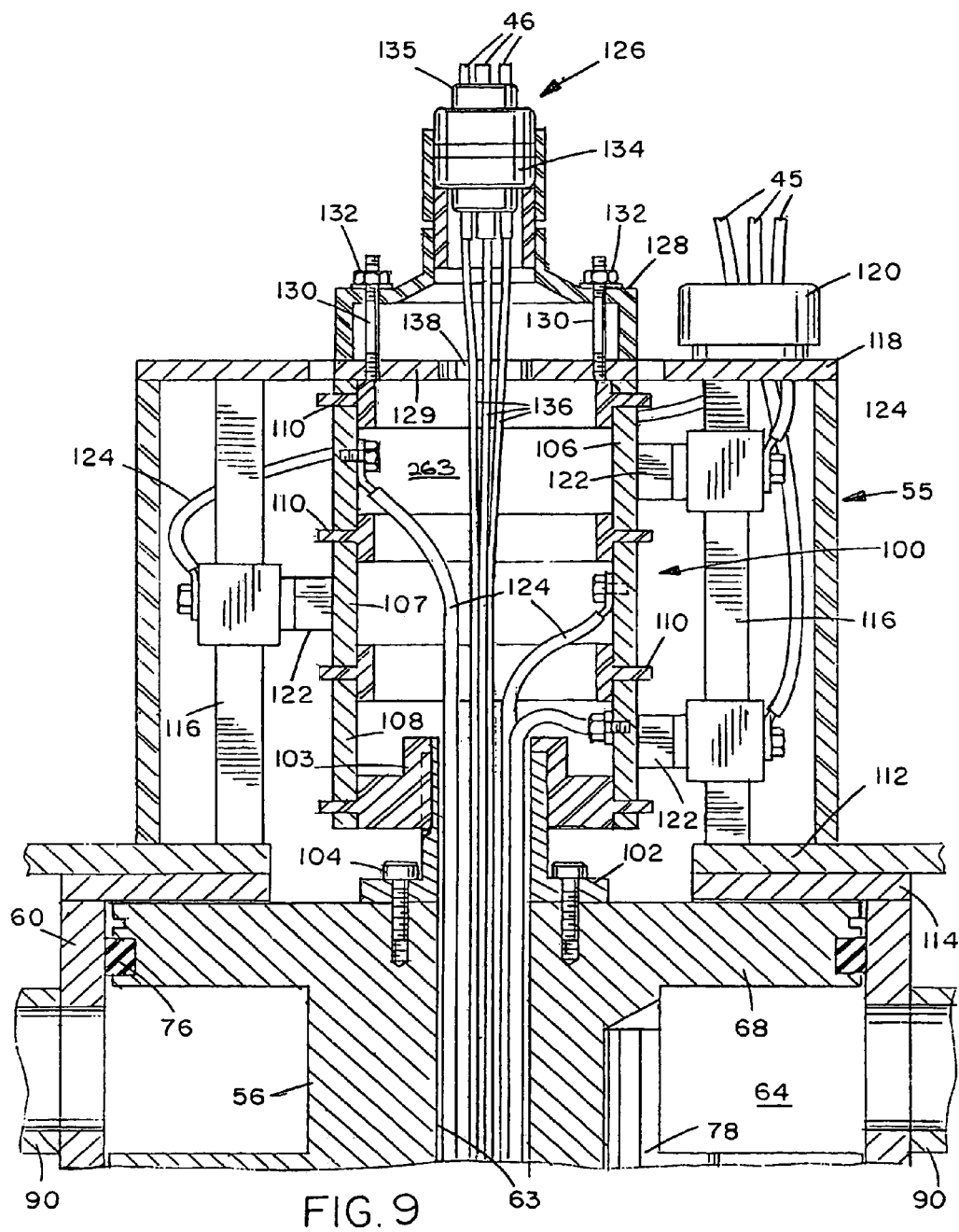
FIG. 9 is a sectional view of the electrical part of the swivel assembly.
Figure 10:
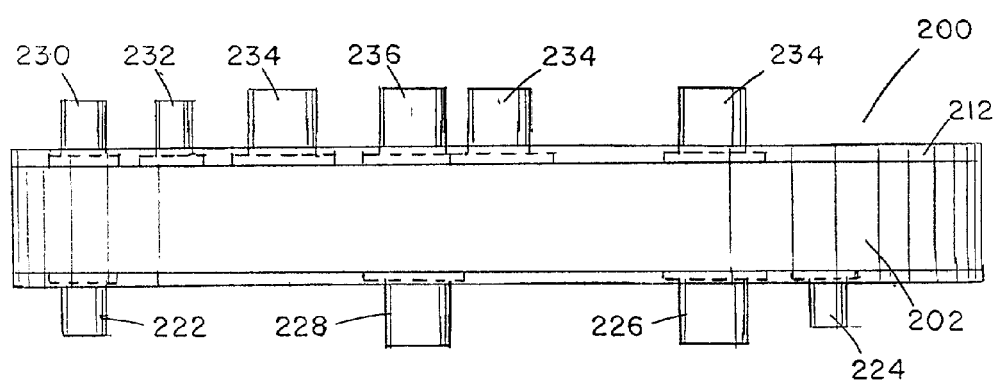
FIG. 10 is aside view of a rotatable swivel apparatus according to a second embodiment of the invention.

The upper or electrical swivel assembly 55 is mounted on top of the plumbing part 54 of the swivel, as illustrated in FIGS. 3, 4 and 9. As best illustrated in FIG. 9, the electrical supply swivel assembly 55 is a three conductor electrical swivel, and includes an inner, fixed contact core 100 which is secured to the upper end of the fixed utilities spool 56 via coupling sleeve 102 secured to the upper end of the spool by mounting bolts 104, and an end plug 103 of the core which is keyed to the coupling sleeve 102. The first member or spool 56 and the contact core 100 have aligned central through bores 63,263, as best illustrated in FIG. 9. Electrical power supply lines 105 extend upwardly through the central through bore 63 in the fixed spool 60, into the central bore 263 of the contact core 100, and are secured to three separate conductive rings 106,107 and 108 in the core 100, which are separated by insulator rings 110.

The electrical swivel assembly 55 has an outer contact portion having a base plate 112 secured to the top plate 114 of the outer swivel casing 60 of the plumbing swivel, and a series of upwardly projecting posts 116 projecting upwardly from the base plate around a ring spaced outwardly from core 100, and connected to a top plate 118 at the upper end of the swivel. A junction box 120 is mounted on the rotating top plate 118 and the power supply lines 45 extend upwardly from box 120 along the elevator shaft and project outwardly for connection to various electrical sockets and appliances within the rotating portion of the house. Spring loaded brushes 122 project inwardly from the posts 116 to contact the three conductive rings 106,107, and 108, respectively. A connecting line 124 extends from each brush 122 to the junction box 120, as illustrated in FIG. 9.

An eight conductor, low noise rotating electrical connector 126 is mounted on top of the electrical swivel 55 via a rubber coupling sleeve 128 bolted to the top plate 129 of the fixed part of the electrical swivel via threaded rods 130 and bolts 132. The connector 126 has a lower fixed portion 134 and an upper rotating portion 135 which is connected to the various electrical service lines 46 extending into the house for communication of TV, telephone and computer signals and the like. The fixed portion 134 is coupled to the fixed core 106 of the electrical swivel. Fixed electrical service lines 136 for cable, computer, TV and telephone signals extend upwardly through the central bore 63 in the fixed spool 56, the center of the fixed power conducting core 106 of the electrical swivel, and a central opening 138 in the top plate 118 of the rotating part of the electrical swivel, and are connected to the fixed lower portion 134 of the rotary connector 126.

The electrical swivel 55 may be a standard, off-the-shelf electrical slip ring swivel for providing 240 Volt, 200 Amp electrical supply to the rotating portion of the structure. The upper, rotary electrical connector 126 is preferably an eight wire, mercury filled rotating harness which is very low noise and produces minimal signal interference, such as the Model No. 830 rotating connector available from Mercotac Inc. of Carlsbad, Calif., or equivalents. Similar connectors with a greater or lesser number of conductors or different amperage or voltage may be used if required.

A suitable drive mechanism (not illustrated) will be provided for rotating the rotatable portion 10 of the house in either direction relative to the fixed base 12, with the swivel joint apparatus allowing all of the utility and electrical service lines within the rotating portion of the house to rotate relative to the fixed part of the apparatus 14. In an exemplary embodiment, the drive mechanism used a three horsepower motor with ramp up and ramp down speed control so movement will not be felt by individuals within the moving part of the structure. The movement can be stopped, reversed, or varied as desired via a control panel within the building, and may be manual or voice controlled.

FIGS. 10 to 13 illustrate an alternative swivel joint apparatus 200 according to a second embodiment of the invention, which may be used in place of the apparatus 14 in FIGS. 1 and 2. In this embodiment, the spool with axially spaced, annular and outwardly facing chambers is replaced by a first member comprising a lower, fixed circular member 202 having a plurality of radially spaced, upwardly facing annular grooves forming chambers 204,206,208,210 of varying volumes, depending on the nature of the fluid to be transported through the chambers. The fixed member 202 is suitably secured to part of the fixed base of the rotating building, in a similar manner to the previous embodiment. Member 202 has an upwardly directed, annular peripheral rim 212. As best illustrated in FIG. 12, the chambers 204,206,208,210 have upwardly directed openings.

A second part or member 214 of the swivel apparatus comprises a generally flat, upper circular plate which is rotatably mounted on top of the fixed member 202 so as to extend over the upper end openings of each of the annular chambers, forming a rotating upper wall portion of each chamber. Member 214 is located in position by an inwardly directed flange 213 on the upper end of the annular rim 212 of the fixed member. A plurality of screw fasteners 215 allow the members 202,214 to be separated for maintenance purposes. The second member or plate 214 is suitably secured to a rotating part of the building, in a similar manner to the previous embodiment. The fixed and rotating members 202,214 have aligned, central openings forming a passageway 216 for electrical supply lines 105 and service lines 134 from the fixed base of the housing to the electrical portion 55 of the swivel, which will be identical to the previous embodiment. It will be understood that a suitable fixed sleeve (not illustrated) may be secured to the central opening of the fixed member 202 and extend upwardly, with clearance, through the opening of the rotating member 214 in order to provide the fixed anchor for the non-moving parts of the electrical swivel.

An upwardly facing, annular sensor chamber 218 is provided between each adjacent pair of annular chambers, and at a location spaced outwardly from the outermost annular utility chamber 204. A pair of annular ring seals 220 are mounted in the upper face of member 202 on opposite sides of each sensor chamber 218, between the sensor chamber and the adjacent utility chamber. Sensor chambers 218 and ring seals 220 have the same purpose as the ring seals 76 and sensor chambers 96 of the previous embodiment. A plurality of water and/or gas sensors are located in the respective sensor chambers, dependent on the fluid transported through the adjacent two chambers, and are connected to a suitable control unit for providing an indication of any seal failure. As in the previous embodiment, each sensor chamber incorporates multiple, spaced sensors for detecting any failure of the ring seals 220, which will be of equivalent durability and reliability to the seals 76 described above.

Each of the utility chambers 204, 206, 208, and 210 is connected to at least one port of a first set of ports 222, 224, 226, and 228 extending upwardly from the lower wall of member 202 into the lower end of the chamber, and at least one port of a second set of ports 230, 232, 234, and 236 extending through the rotating member or plate 214. The outermost chamber 204 is for clean water supply to the house, the next chamber 206 is for gas, the third chamber 208 is for sewer discharge, and the fourth chamber 210 is for gray or waste water discharge. A first port 222 of the first set of ports is connected to a fixed water inlet line in the base of the building and extends through the lower wall of member 202 into chamber 204, as indicated in FIG. 12. A second port 224 of the first set is connected to a fixed gas inlet line and extends through member 202 into the chamber 206. A third port 226 of the first set is connected to the fixed sewer line and extends through member 202 into chamber 208. Finally, a fourth port 228 of the first set is connected to the gray water outlet line in the fixed base of the building and extends through member 202 into the chamber 210.

Figure 11:
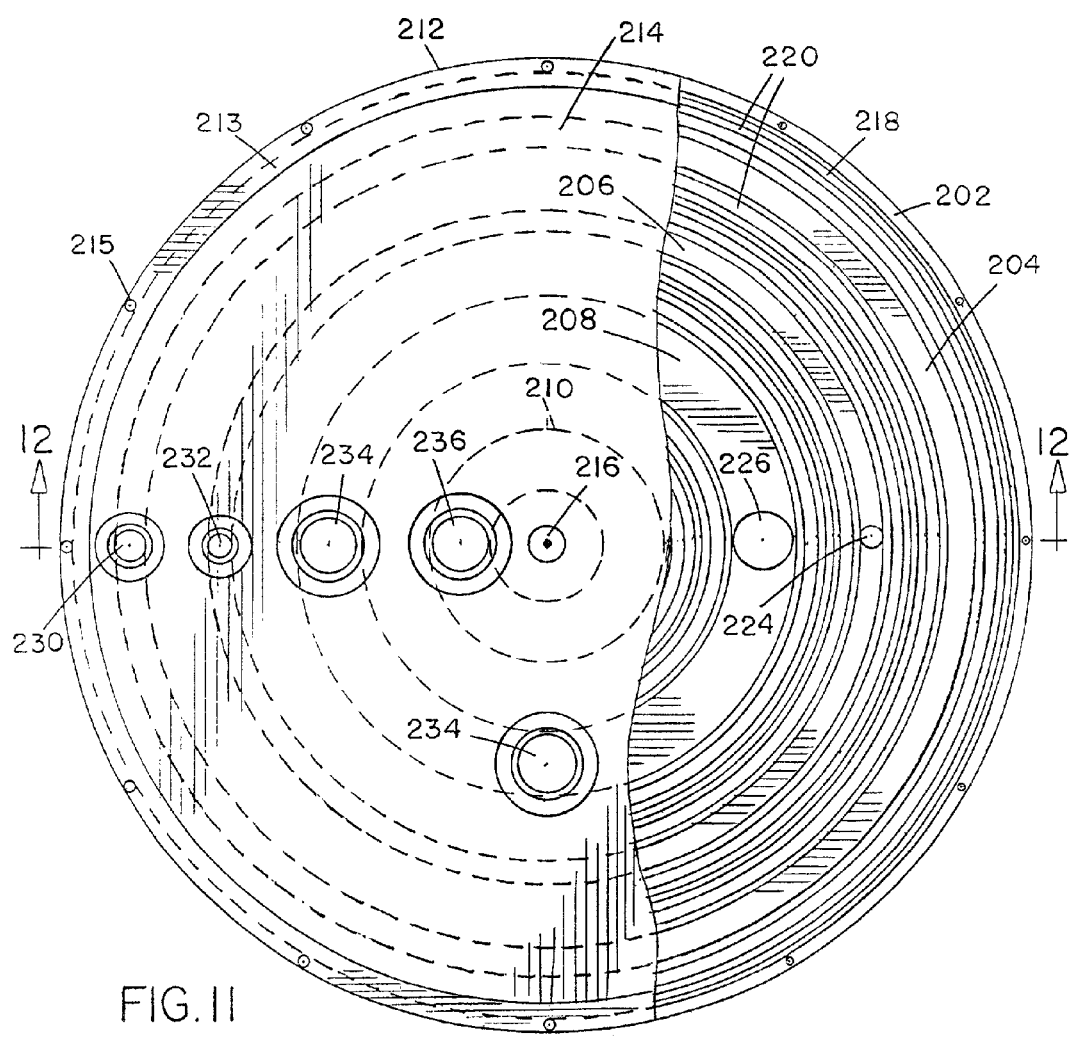
FIG. 11 is a top plan view of the apparatus of FIG. 10, with the top plate partially cut away.

As best illustrated in FIGS. 11 and 12, the second set of ports extend through the rotatably mounted plate or second member 214 into the respective utility chambers, with the number of ports to each chamber dependent on the number of lines required to and from the rotating part of the building. It will be understood that a greater or lesser number of ports may be provided, as required. Not all of the ports are visible in the drawings. Each annular chamber will have one or more ports spaced around an annular ring-shaped region of plate 214 lying directly over the respective chamber. There may be at least two spaced water outlet ports 230 connected to the water chamber 204, and at least one gas outlet port 232 connected to gas chamber 206 for water and gas supply to the building. Three spaced inlet ports 234 communicate with the sewer chamber 208 for sewer discharge from plumbing fixtures within the building. Finally, at least one inlet port 236 communicates with the gray water chamber 210 for gray water discharge through outlet port 228.

Operation of the swivel apparatus of FIGS. 10 to 13 will be equivalent to that of the previous embodiment. The drive mechanism will rotate the house relative to the fixed base, such that plate 214 rotates with the house on the fixed member 202, so that each port 230, 232, 234, and 236 will rotate over the underlying chamber in a circular path, such that it always communicates with the respective chamber. With this arrangement, as well as the swivel apparatus of the first embodiment, all utilities such as plumbing fixtures, gas heating and other gas fixtures, electrical outlets, phone jacks, computer hook ups, and the like, can all be situated readily within the rotating part of the building, and connected to the rotating electrical or utility part of the swivel apparatus. The swivel then connects each utility line to the appropriate line or port in the fixed part of the swivel. The use of two seals along with redundant sensors between each adjacent pair of utility chambers for directing fluids between the fixed and rotating parts of the swivel ensures that failure of a single seal will not result in mixing of fluids, such as clean and gray water, for example, and the sensors ensure that an alarm indicator will be activated in the event of any failure. The apparatus is of relatively simple construction and is easily accessible for maintenance purposes such as seal replacement.

The swivel joint apparatus of this invention is very simple in construction and allows for easy access and repair. It has built in sensors for detecting any failure in the seals, and the seals, rotary bearings, and other portions of the apparatus are of sufficient strength and durability to potentially last over twenty years without any major service. Unlike prior art swivel joints for rotating buildings, the swivel apparatus of both embodiments will meet most building codes for plumbing and electrical connections.

Although some exemplary embodiments of the invention have been described above by way of example only, it will be understood by those skilled in the field that modifications may be made to the disclosed embodiments without departing from the scope of the invention, which is defined by the appended claims.

We claim:

1. A swivel joint apparatus for supplying utilities to a rotating building rotatable about a central axis, comprising:
a first, fixed member for securing to a fixed base of a rotating building to extend co-axially with the central axis of rotation of the building, the first member having a plurality of annular chambers each having an annular opening directed away from the first member;
a second member rotatably mounted on the first member for securing to a portion of the rotating building, the second member extending over the chamber openings in the first member to form rotating wall portions closing the respective chambers;
a plurality of seals between the first and second member for sealing the chambers;
the first member having a first set of ports connected to the respective chambers for connection to fixed utility lines in the base of the building; and
the rotatable member having a second set of ports connected to the respective chambers for connection of utility fluids to and from the rotating part of the building.

2. The apparatus as claimed in claim 1, wherein the first member comprises an inner, fixed spool having a series of axially spaced, outwardly projecting annular flanges defining said annular chambers between each adjacent pair of flanges, each flange having an outer peripheral edge and at least one ring seal mounted on the peripheral edge of each flange, the flanges having a predetermined outer diameter; and
the second member comprises an outer casing rotatably mounted on the spool for securing to part of the rotating building, the casing having an inner diameter substantially equal to the outer diameter of the flanges, the casing forming an outer wall of each of the annular chambers and being in rotatable sealing engagement with each of the ring seals to seal the chambers.

3. The apparatus as claimed in claim 2, wherein the spool has a lower end wall, said first ports extending through said lower end wall, and a bore extending from each port through the spool to a respective annular chamber, whereby each chamber is connected to at least one first port in the lower end wall; and the second ports are provided at axially spaced locations on said casing, with at least one second port communicating with each of said annular chambers.

4. A swivel joint apparatus for supplying utilities to a rotating building rotatable about a central axis, comprising:

a first, fixed member for securing to a fixed base of a rotating building to extend co-axially with the central axis of rotation of the building, the first member having a plurality of annular chambers each having an opening directed away from the first member;

a second member rotatably mounted on the first member for securing to a portion of the rotating building, the second member extending over the chamber openings in the first member to form rotating wall portions closing the respective chambers;

a plurality of seals between the first and second member for sealing the chambers;

the first member having a first set of ports connected to the respective chambers for connection to fixed utility lines in the base of the building; and the rotatable member having second set of ports connected to the respective chambers for connection of utility fluids to and from the rotating part of the building;

the first member comprising an inner, fixed spool having a series of axially spaced, outwardly projecting annular flanges defining said annular chambers between each adjacent pair of flanges, each flange having an outer peripheral edge and at least one ring seal mounted on the peripheral edge of each flange, the flanges having a predetermined outer diameter; and the second member comprises an outer casing rotatably mounted on the spool for securing to part of the rotating building, the casing having an inner diameter substantially equal to the outer diameter of the flanges, the casing forming an outer wall of each of the annular chambers and being in rotatable sealing engagement with each of the ring seals to seal the chambers; and each flange having an outwardly directed, annular sensor chamber spaced outwardly from the ring seal, the outer casing having a plurality of holes including at least one hole aligned with each of the sensor chambers, and a plurality of fluid sensors are mounted in the outer casing to project through the respective holes to sense any leakage of fluid past any of the seals.

5. The apparatus as claimed in claim 1, wherein one of the annular chambers comprises a sewer chamber for connecting rotating sewer lines within the rotatable building to fixed sewer lines within the base, the first member having more than one port in continuous communication with the sewer chamber and the second member having a plurality of ports in continuous communication with the sewer chamber.

6. The apparatus as claimed in claim 5, wherein the annular chambers further include a water chamber for supply of water from a fixed water line in the base to water supply lines within the rotating building, and a gray water chamber for connecting at least one gray water drain line within the rotating building to gray water drain outlet line in the base.

7. The apparatus as claimed in claim 6, wherein the annular chambers include a gas supply chamber for connecting a gas supply line in the base to gas supply lines within the rotatable building.

8. The apparatus as claimed in claim 2, wherein the annular flanges include two end flanges at opposite ends of the spool forming an outer end wall of respective opposite end chambers, and a plurality of spaced intermediate flanges separating adjacent chambers along the length of the spool, each intermediate flange having a pair of spaced ring seals projecting outwardly from its peripheral edge in rotatable sealing engagement with said outer casing.

9. A swivel joint apparatus for supplying utilities to a rotating building rotatable about a central axis, comprising:

a first, fixed member for securing to a fixed base of a rotating building to extend co-axially with the central axis of rotation of the building, the first member having a plurality of annular chambers each having an opening directed away from the first member;

a second member rotatably mounted on the first member for securing to a portion of the rotating building, the second member extending over the chamber openings in the first member to form rotating wall portions closing the respective chambers;

a plurality of seals between the first and second member for sealing the chambers;

the first member having a first set of ports connected to the respective chambers for connection to fixed utility lines in the base of the building; and the rotatable member having a second set of ports connected to the respective chambers for connection of utility fluids to and from the rotating part of the building;

the first member comprising an inner, fixed spool having a series of axially spaced, outwardly projecting annular flanges defining said annular chambers between each adjacent pair of flanges, each flange having an outer peripheral edge and at least one ring seal mounted on the peripheral edge of each flange, the flanges having a predetermined outer diameter;

the second member comprises an outer casing rotatably mounted on the spool for securing to part of the rotating building, the casing having an inner diameter substantially equal to the outer diameter of the flanges, the casing forming an outer wall of each of the annular chambers and being in rotatable sealing engagement with each of the ring seals to seal the chambers;

the annular flanges include two end flanges at opposite ends of the spool forming an outer end wall of respective opposite end chambers, and a plurality of spaced intermediate flanges separating adjacent chambers along the length of the spool, each intermediate flange having a pair of spaced ring seals projecting outwardly from its peripheral edge for rotatable sealing engagement with said outer casing; and each intermediate flange having a sensor chamber between the pair of ring seals, and each end flange having a sensor chamber outside the ring seal mounted on the respective end flange, and a plurality of fluid sensors are mounted on the outer casing to extend into the respective sensor chambers to detect leakage of fluid past any of the ring seals, the sensors having outputs for connection to a control unit within the rotatable building to provide an alarm signal in the event of failure of any of the seals.

10. The apparatus as claimed in claim 9, wherein at least two sensors are provided in each sensor chamber.

11. The apparatus as claimed in claim 9, wherein at least one of the annular chambers comprises a gas supply chamber for communicating a gas supply from the fixed base into the rotating part of the building, at least one chamber adjacent the gas supply chamber is a water chamber, and at least one water sensor and one gas sensor is provided in the sensor chamber between the gas supply chamber and water chamber.

12. The apparatus as claimed in claim 1, including an electrical swivel assembly mounted above said first and second members, the electrical swivel assembly comprising a fixed contact core secured to the first member and an outer rotating contact portion secured to the second member, the first and second members and contact core having aligned central through bores for passageway of fixed electrical power supply lines from the base of the building to the contact core and the outer contact portion having contacts for connection to power supply lines supplying power to fixtures within the rotating building.

13. The apparatus as claimed in claim 12 including a rotating electrical connector mounted on said electrical swivel assembly for supply of electrical services to the rotating building, the rotary connector having a fixed portion for connection to fixed electrical service lines extending through the aligned central through bores of the first and second members and electrical contact core, and a rotating portion rotatably mounted on the fixed part for connection to electrical service lines within the rotating building, the rotary part being coupled to the outer rotating contact portion of the electrical swivel.

14. The apparatus as claimed in claim 1, wherein the first and second members comprise a lower fixed circular member and the annular chambers comprising a series of radially spaced, upwardly directed annular grooves in said lower fixed circular member.

15. A swivel joint apparatus for supplying utilities to a rotating building rotatable about a central axis, comprising:

a first, fixed member for securing to a fixed base of a rotating building to extend co-axially with the central axis of rotation of the building, the first member having a plurality of annular chambers each having an opening directed away from the first member;

a second member rotatably mounted on the first member for securing to a portion of the rotating building, the second member extending over the chamber openings in the first member to form rotating wall portions closing the respective chambers;

a plurality of seals between the first and second member for sealing the chambers;

the first member having a first set of ports connected to the respective chambers for connection to fixed utility lines in the base of the building;

the rotatable member having a second set of ports connected to the respective chambers for connection of utility fluids to and from the rotating part of the building;

the first and second members comprising a lower fixed circular member and an upper circular plate rotatably mounted on the lower member, the annular chambers comprising a series of radially spaced, upwardly directed annular grooves in said lower member; and an annular sensor chamber between each adjacent pair of annular chambers, and an annular sensor chamber spaced radially outwardly from the outermost annular utility chamber, and a plurality of upwardly facing circular seals mounted on said lower plate for rotatable sealing engagement with said upper plate, each seal being located between a respective sensor chamber and utility chamber.

* * * * *